Oct. 24, 1967  C. N. HALL  3,348,273
3-WAY AUTOMOBILE TIE-DOWN HOOK
Filed March 29, 1966

INVENTOR
Clarence Norman HALL

Fetherstonhaugh & Co.

ATTORNEYS

United States Patent Office 3,348,273
Patented Oct. 24, 1967

3,348,273
3-WAY AUTOMOBILE TIE-DOWN HOOK
Clarence Norman Hall, 8 Rothsay Ave.,
Toronto, Ontario, Canada
Filed Mar. 29, 1966, Ser. No. 538,254
5 Claims. (Cl. 24—230.5)

The present invention relates to an automobile tie-down hook, and praticularly relates to a tie-down hook for securing automobiles during transportation on a single or multi-level racked railway flat car, although other applications are possible such as on automobile transport road vehicles.

It is known that many new automobiles are transported from the factory to various places throughout the nation by railway with the automobiles being secured on a single or multi-decked flat car. The automobiles are usually secured on the flat car at each corner of the automobile via a hook passing through a hole or slot in the frame of the automobile, and a chain attached to the hook which is secured to the flat car by a ratchet tightening arrangement.

Some makes of automobiles however have circular holes in the frame while others have slotted apertures, it is necessary that different tie-down hooks be used with different types of automobiles. For example, the frames of automobiles manufactured by General Motors, Ford and Volvo are provided with vertical slots and to tie these automobiles down it is necessary to employ what is called a T hook, whereas it is necessary to use an S hook on automobiles made by for example Chrysler, American Motors, Studebaker as the fames of these automobiles are provided with circular holes. It will readily be apparent that the hook design for slotted frame apertures cannot be used in circular frame apertures and vice versa, and accordingly it is necessary to keep both types of hooks and attached chains available on all transport flat cars at all times. The necessity of providing and carrying both types of hooks of course increases the cost of railway equipment, and at the same time increases the operators tie-down time by him having to select appropriate equipment.

The present invention solves these problems and disadvantages by providing a hook which is engageable in the apertures in the frames of all types of cars whether the apertures be circular or slotted, thereby reducing the number of hooks and chains necessary for any one flat car by one-half and also reducing the work time necessary to secure an automobile on a flat car.

It is the primary object of the present invention then to provide a hook engageable in apertures in the frame member of an automobile to secure, in association with a chain and chain tightening device, the automobile to a single or multi-decked vehicle transport or flat car, regardless of whether the apertures are circular or slotted.

It is a further object to provide a combination hook comprising a central body portion and two projecting arm members formed integral therewith, one of said projecting arm members being tapered and curving at its outermost end, and the outer end of the second of said projecting arm members being integrally formed as a cross-bar axially oriented normal to the axis of said second arm member, and flattened surfaces provided on the central body portion adjacent each of the projecting arm members, and an aperture formed in the central body portion to receive a chain link or clevis.

These and other objects of the invention will become apparent from the following description in conjunction with the accompanying drawings wherein:

FIGURE 1, illustrates a conventional tie-down arrangement, and FIGURES 2 and 3 illustrate conventional hooks employed in such arrangement.

Figure 1:
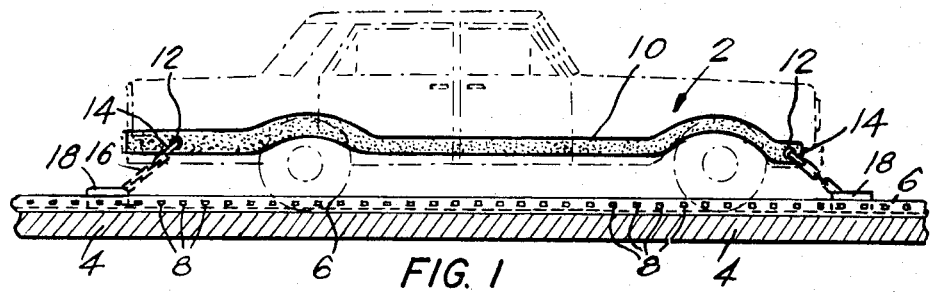
FIGURE 1 illustrates in side view an automobile tied down on a flat car by hooks passing through apertures provided in the automobile frame by conventional methods.

In FIGURE 1 an automobile generally indicated at 2 is shown positioned on a flat car indicated generally at 4. The flat car is provided with two longitudinally extending rails 6 having uniformly spaced holes 8, and in the case of multi-decked flat cars the tires of the automobiles ride in these U-shaped rails. One side of an automobile frame 10 is shown in FIGURE 1 having apertures 12 to receive tie-down hooks 14 which are affixed to chains 16 which in turn are attached to a wrench operated ratchet mechanism 18 to tighten the chain 16 to secure the automobile onto the flat car. The ratchet mechanism may be secured in contact with the rail holes 8 anywhere along the length of the rails 6 depending upon the length of the automobile being secured and the positioning of the frame apertures.

Figure 2:
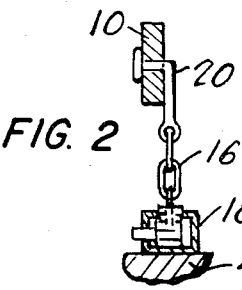
FIGURE 2 illustrates one type of conventionally used hook, the T hook.
Figure 3:
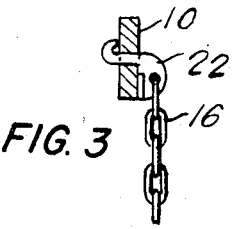
FIGURE 3 illustrates a second type of conventionally used hook, the S hook.

In the case of automobiles having slotted frame apertures, a T-hook 20 as shown in FIGURE 2 is conventionally employed, the bar of the T-hook being inserted into the slot and the hook turned 90° to secure the T-hook in the slot. With circular shaped apertures an S-hook 22 as shown in FIGURE 3 is employed. Thus it is necessary to have both T and S type hooks on hand in order to secure automobiles of different manufacture.

Figure 4:
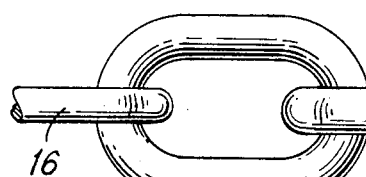
FIGURE 4 illustrates the combination hook of the present invention in side view showing the hook attached to a securing chain.
Figure 5:
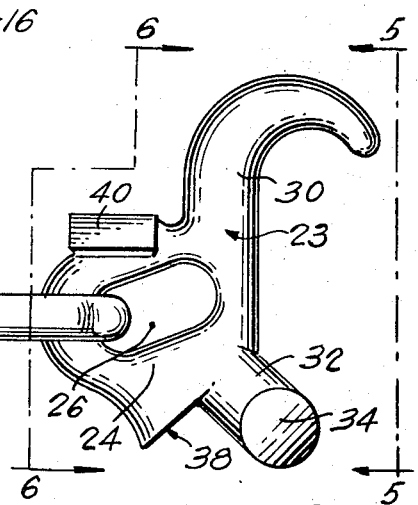
FIGURE 5 is a view of the combination hook in the direction of line 5—5 of FIGURE 4.
Figure 5:
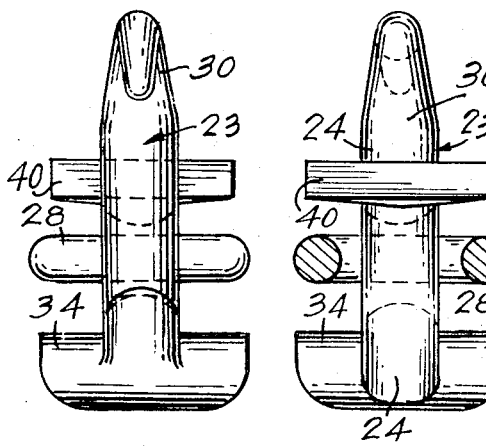
Figure 6:
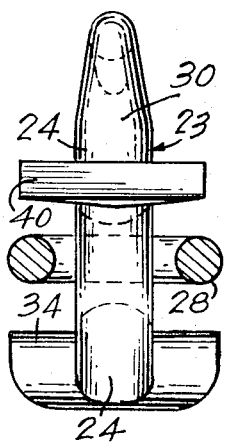
FIGURE 6 is a view of the combination hook in the direction of line 6—6 of FIGURE 4.

FIGURE 4 illustrates the combination tie-down hook of the present invention in side view, and FIGURE 5 is a view along line 5—5 of FIGURE 4, and FIGURE 6 is a view along line 6—6 of FIGURE 4. The combination hook generally indicated at 23 consists of a central body portion 24 having a slotted aperture 26 through which a chain-link 28 (or clevis) is inserted to secure the hook to tie-down chain 16. Integrally formed with body portion 24 is a tapering first projecting arm 30 curved at its outermost end, and a second projecting arm 32 terminating in an integral cross-bar member 34, the cross-bar member 34 being axially oriented normal to the axis of the integral second projecting arm 32. The outermost corners of the cross-bar member are spherically rounded (as at 36 in FIG. 6) to facilitate entry (and removal) of the cross-bar 34 in a slot in the frame of an automobile.

The central body member 24 has a flattened contacting surface 38 adjacent the second projecting arm 32, and a second flattened laterally projecting surface contacting member 40 formed integral with said central body portion 24 and adjacent said tapering first projecting arm 30. The frame contacting member 40 extends laterally from each side of the central body portion in a plane parallel with the axis of the cross-bar member 34. It will be noted that the planes of the flattened surfaces 38 and 40 are substantially normal to the axial direction of the adjacent projecting arm members 32 and 30 respectively.

Figure 7:
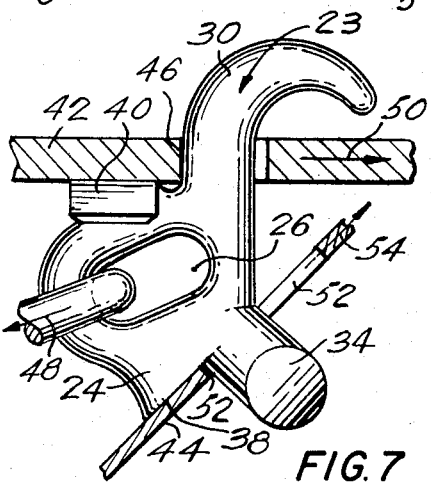
FIGURE 7 is a side view of the combination hook showing for purposes of example only the hook being engaged in a circular aperture in one automobile frame and also the hook being engaged in a slotted aperture in another automobile frame.

FIGURE 7 illustrates the structure of this invention in side view, and is shown secured to the frames 42 and 44 of two different automobiles for purpose of illustration only as it will be understood that only one of the projecting arms 30 and 32 will be employed in any one installation. The automobile frame section shown at 42 is provided with a circular hole or aperture 46, and the tapering curved projecting arm 30 portion of the hook 23 is used in this instance. The hook 23 is hooked to frame 42 by inserting projecting arm 30 into hole or aperture 46 and then turning the hook to bring frame contacting member 40 in surface contact with frame 42. The pull from the securing chain and ratchet mechanism (not shown) is downward in the direction of arrow 48 thus positively securing the hook 23 within the frame aperture. The upper side of the frame 42 is indicated by the direction of arrow 50.

An automobile frame 44 having a vertical slotted aperture 52 is also shown in FIGURE 7. With frames having slotted apertures, the second projecting arm 32 carrying integral cross-member 34 is employed. The hook is engaged in the slot by inserting cross-bar or member 34 into slot 52, and then turning the hook 90°. The frame engaging flattened surface 38 of the hook is then in surface contact with frame 44 and as the chain is tightened in the direction of arrow 48, the hook securely locks on the frame. The upper side of frame 52 is indicated by the direction of arrow 54.

While the preferred use of the present combination hook is on single or multi-decked railway flat cars, equal application is on road travelling vehicle transports.

What I claim is:

1. A combination hook comprising a central body portion and two projecting arm members formed integral therewith, one of said projecting arm members being tapered and curving at its outermost end, and the outer end of the second of said projecting arm members being integrally formed as a cross-bar axially oriented normal to the axis of said second arm member, and flattened surfaces provided on the central body portion adjacent each of the projecting arm members, and an aperture formed in the central body portion to receive a chain link or clevis.

2. A hook according to claim 1 wherein the planes of the flattened surfaces are substantially normal to the axial direction of the adjacent projecting arm members.

3. A hook according to claim 1 wherein the flattened surface adjacent the tapered and curved projecting arm member projects laterally on each side of the central body portion in a plane substantially parallel with the axis of the cross-bar.

4. A hook according to claim 1 wherein the outermost corners of the cross-bar member are spherically rounded.

5. A hook according to claim 1 wherein the aperture in the central body portion is in the form of a slot.

References Cited

UNITED STATES PATENTS

| | | | |
|---|---|---|---|
| 2,322,576 | 6/1943 | Huebshman et al. | 24—230.5 |
| 2,351,176 | 6/1944 | Wirkkala | 24—230.5 X |
| 3,018,079 | 1/1962 | Stough et al. | 248—119 |
| 3,215,390 | 11/1965 | De Shetle | 24—230.5 X |

ROY D. FRAZIER, *Primary Examiner.*

F. DOMOTOR, *Assistant Examiner.*